(12) United States Patent
Hickman et al.

(10) Patent No.: US 8,718,822 B1
(45) Date of Patent: May 6, 2014

(54) OVERLAYING SENSOR DATA IN A USER INTERFACE

(76) Inventors: Ryan Hickman, Mountain View, CA (US); Thor Lewis, San Francisco, CA (US)

(*) Notice: Subject to any disclaimer, the term of this patent is extended or adjusted under 35 U.S.C. 154(b) by 158 days.

(21) Appl. No.: 13/440,656

(22) Filed: Apr. 5, 2012

Related U.S. Application Data

(60) Provisional application No. 61/595,847, filed on Feb. 7, 2012, provisional application No. 61/483,300, filed on May 6, 2011.

(51) Int. Cl.
*G05B 15/00* (2006.01)
*G06F 7/00* (2006.01)

(52) U.S. Cl.
USPC ........... 700/259; 700/214; 700/218; 700/245; 700/246

(58) Field of Classification Search
USPC ......... 700/214, 218, 245, 246, 259, 260, 264; 318/568.11; 340/540, 683
See application file for complete search history.

(56) References Cited

U.S. PATENT DOCUMENTS

| | | | |
|---|---|---|---|
| 5,038,089 A * | 8/1991 | Szakaly | 701/23 |
| 2011/0172822 A1* | 7/2011 | Ziegler et al. | 700/259 |
| 2011/0238211 A1* | 9/2011 | Shirado et al. | 700/246 |
| 2011/0306986 A1* | 12/2011 | Lee et al. | 606/130 |

* cited by examiner

*Primary Examiner* — Ian Jen (57) ABSTRACT

Methods and systems for robot functions and user interfaces are described. A server may receive a set of robot parameters, and may predict new parameters based on a robot command. In this manner, a user may receive parameters corresponding to the predicted values and mitigate network and processing latency. In other examples, a robot may provide a forward looking image and a robot speed. When a command to move forward is issued, the server may provide a predicted image and predicted speed. The server may be able to calculate a predicted image and a predicted speed (or other parameter) more quickly than the robot could provide the same information. The predicted information may be displayed on a user interface with a corresponding indication that the values are predicted. The robot may provide the server and the user interface with the actual data when it is available.

28 Claims, 9 Drawing Sheets

OVERLAYING SENSOR DATA IN A USER INTERFACE

CROSS REFERENCE TO RELATED APPLICATION

The present application claims priority to Provisional U.S. Patent Application Ser. No. 61/483,300, filed on May 6, 2011 and Provisional U.S. Patent Application Ser. No. 61/595,847, filed on Feb. 7, 2012, the entire contents of both are herein incorporated by reference.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software that collect commands from the user and interpret the commands into commands on the servers. The servers may handle the computing, and can either store or retrieve information from database servers or file servers and display an updated page to the user. Through "cloud computing", data across multiple servers can be synchronized around the world allowing for collaborative work on one file or project, from multiple users around the world, for example.

SUMMARY

This disclosure may disclose, inter alia, methods and systems for robot cloud computing.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

In the Figures.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for robot cloud computing. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from robot depending on requirements. In some examples, a robot may be configured to receive a second device, such as mobile phone, that may be configured to function as an accessory or a "brain" of the robot.

In examples described herein, a robot may interact with the cloud to perform any number of actions, such as to share information with other cloud computing devices. Within examples, a server may receive a location of a robot, and may determine a future location of the robot. The server may then determine a representation of image data from the robot corresponding to the future location, and send the representation to a user. In this manner, a user may receive image data corresponding to a view of the robot as currently seen by the robot so as to enable remote control of the robot over weakly connected networks. In other examples, a robot may be moving forward, and may capture image data of the forward view. The image data may be provided to a user, and the cloud may also provide alternate views from the standpoint of the robot to the user. A robot-user interface may be provided that is overlaid onto image data received from the robot.

In additional examples, the robot may provide a variety of parameters (e.g. speed, position, battery life, orientation, operation mode, acceleration, system status, etc.) to the cloud for display on a robot-user interface. The cloud may predict values of the parameters before the robot has reported actual values. The predicted values of the parameters may be displayed on the robot-user interface while the actual values are being transmitted to the cloud from the robot. The cloud may also transmit a confidence indicator to the user's device for display in the robot-user interface. Thus, the user would know if the shown parameters are calculated or actual values.

1. Cloud Computing Architecture

Figure 1:
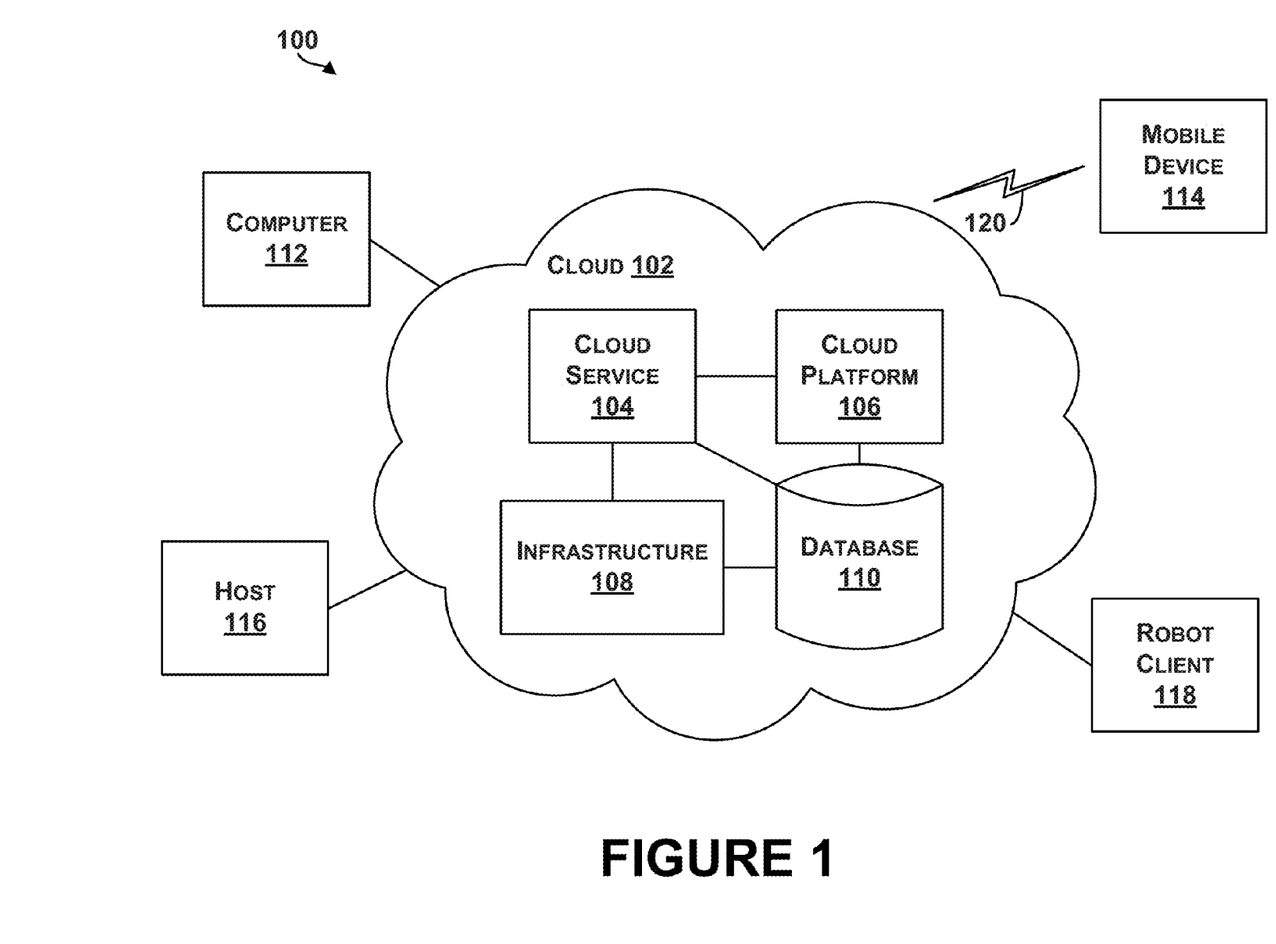
FIG. 1 is an example system for cloud-based computing.

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices, in some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

The communication links may change depending on the type of data being sent or network conditions. In some embodiments, packets may be sent either based on the Transmission Control Protocol (TCP) or the User Datagram Protocol (UDP). In some applications, some data may be sent over a TCP link while additional data is sent over a UDP link. Each protocol has specific advantages and disadvantages. For example, a TCP connection is more reliable, with each packet being verified upon receipt. The TCP protocol also verifies the receipt of packet so if a packet it lost, it can be transmitted again. Contrarily, the UDP protocol does not have any packet verification. A UDP data stream is more like a data dump, where the receiver may not receive every packet and some packets may be corrupt.

Despite UDP not having data verification, in some applications the use of the UDP protocol may be desirable. UDP may be desirable for video streaming. If a packet is lost or corrupt, the overall video stream may not suffer significantly. However, when transmitting commands to a remote device, TCP may be desirable and the reception and verification of each packet helps ensure a correct command is transmitted. In some embodiments, the data protocol may be changed on device operating conditions. For example, UDP may be used to stream video or position information until a threshold is reached, then the connection could fall back to TCP to ensure the data is accurate. For example if a data connection is transmitting position information, if the information indicated there may be an obstacle nearby, a TCP connection may be desired to make sure the most accurate information is received.

In addition to protocol switching, data compression may be changed on the fly as well. Data compression levels may change based on network conditions, processing capabilities, battery conditions, or other factors. For example, live in-motion video from a robot may be sent to the cloud at a lower resolution than still images. In some embodiments, the robot may record video at a full resolution, but live-stream a lower resolution video. The higher resolution video may be cached on the robot for later transmission to the cloud.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol CDMA, GSM, or WiMAX, as well as for "WiFi" connectivity using 802.11). Additionally, some client devices may include a means of telephonic commination. In some example embodiments, a client device may not be able to make a traditional data connection. However, data connectivity may also be made through a telephone call. Other examples are also possible.

2. Example Robot Architecture

Figure 2A:
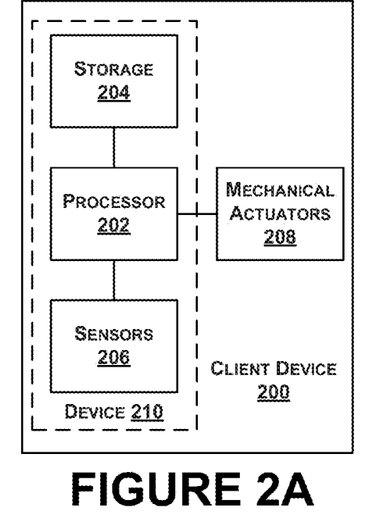
FIG. 2A illustrates an example client device.

FIG. 2A illustrates an example client device 200, in one example, the client device 200 is configured as a robot. In some examples, a robot may contain computer hardware, such as a processor 202, memory or storage 204, and sensors 206. For example, a robot controller (e.g., processor 202, computing system, and sensors 206) may all be custom designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include, smoke sensors, light sensors, radio sensors, infrared sensors, microphones, speakers, gyroscope, accelerometer, a camera, radar, capacitive sensors and touch sensors, etc.

The client device 200 may also have components or devices that allow the client device 200 to interact with its environment. For example, the client device 200 may have mechanical actuators 208, such as motors, wheels, movable arms, etc., that enable the client device 200 to move or interact with the environment.

In some example, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some example, the client device 200 may be configured to receive a device, such as device 210, that includes the processor 202, the storage 204, and the sensors 206. For example, the client device 200 may be a robot that have a number of mechanical actuators (e.g., a movable base), and the robot may be configured to receive a mobile telephone to function as the "brains" or control components of the robot. The device 210 may be considered a module of the robot. The device 210 may be physically attached to the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone), which can provide additional peripheral components to the device 200, such as any of an accelerometer, gyroscope, compass, GPS, camera, WiFi connection, a touch screen, etc., that are included within the device 210.

Figure 2B:
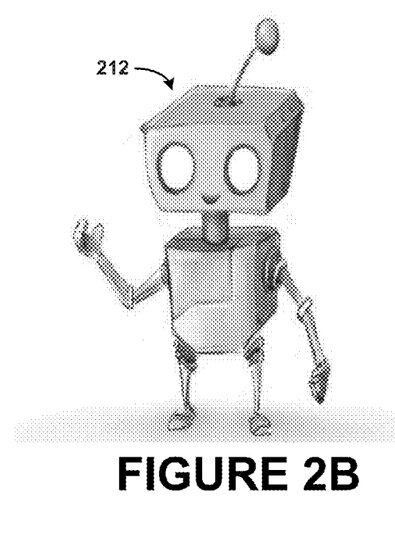
FIG. 2B illustrates a graphical example of a robot.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 12, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
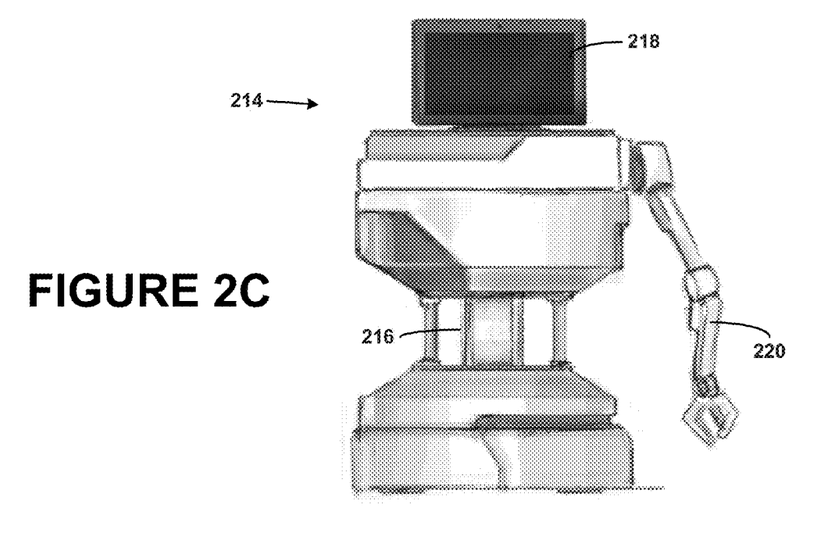
FIG. 2C illustrates another example of a robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

3. Robot and Cloud Interaction

Figure 3:
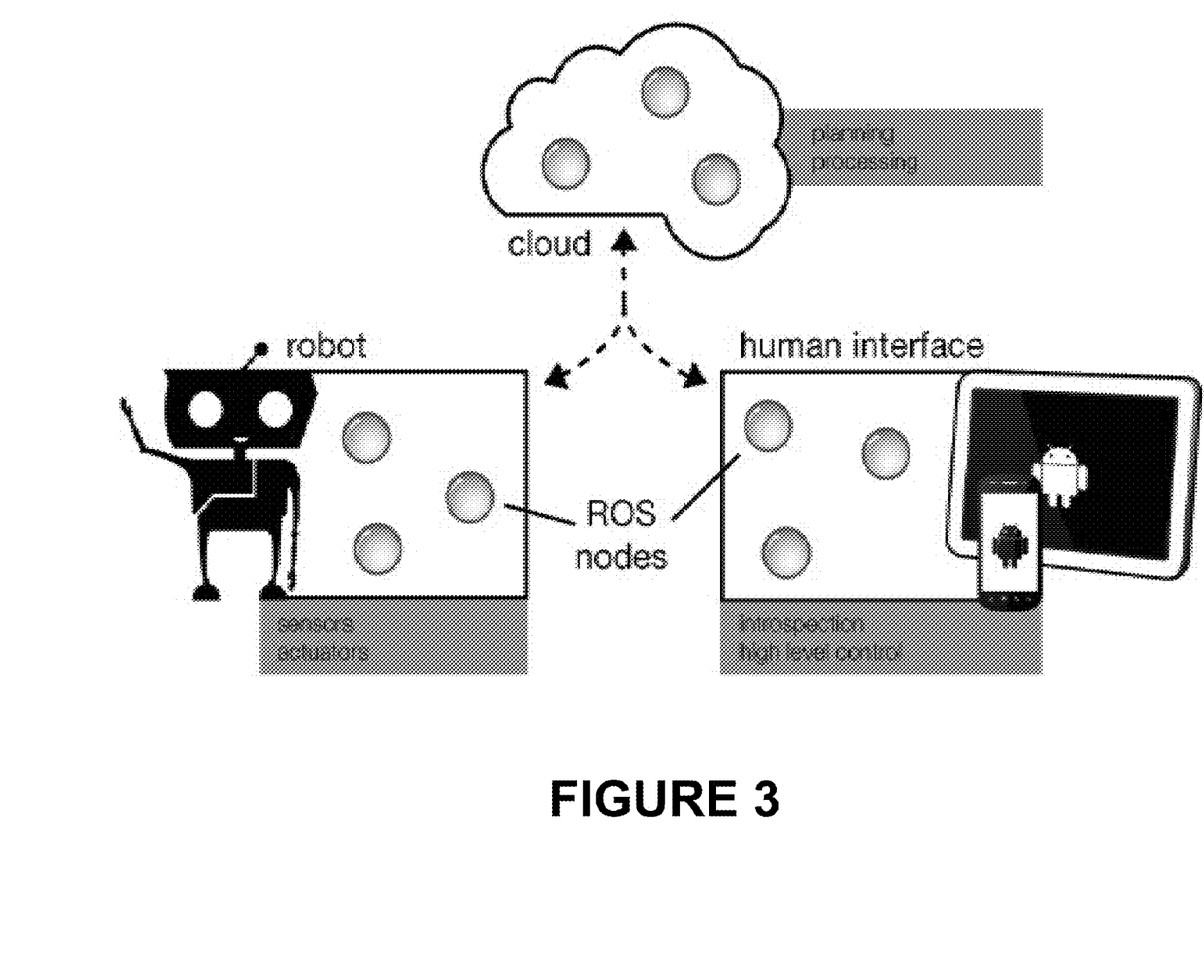
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data instructions from each other so as to provide a specific output or functionality for the robot.

In example, the robot may send data to a cloud for data processing, and in another example, the robot may receive data from the cloud. The data received from the cloud may be in many different forms. The received data may be a processed form of data the robot sent to the cloud. The received data may also come from sources other than the robot. For example, the cloud may have access to other sensors, other robots, and the internet.

Figure 4:
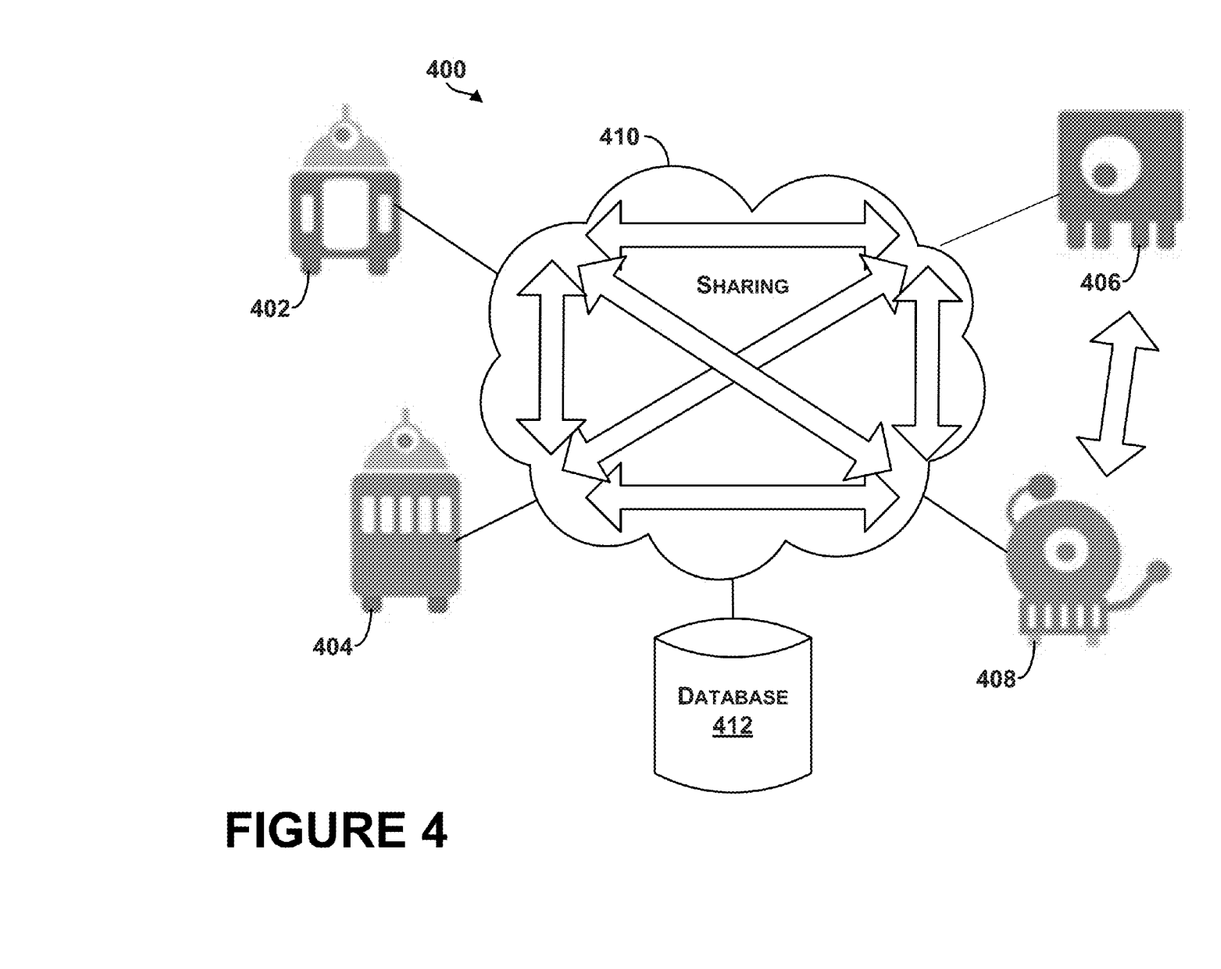
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program on the cloud 410 may be configured to identify the object in the picture and provide data to all the robots connected to the cloud 410 about the recognized object, as well as possibly about other characteristics metadata) of the recognized object, such as a location, size, weight, color, etc. Thus, every robot may be able to know attributes of an object in a photo uploaded by the robot 402.

The robots 402, 404, 406 and 408 may perform any number of actions with an area, people, other robots, etc. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. For example, the robot 402 may traverse a pathway and encounter an obstacle, and can inform the other robots 404, 406, and 408 (through the cloud 410) of a location of the obstacle. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, mapping of a physical location, such as providing data regarding a history of where a robot has been, can be provided. Another number or type of indicators may be recorded to facilitate mapping/navigational functionality of the robots 402, 404, 406, and 408 (e.g., a scuff mark on a wall can be one of many cues that a robot may record and then rely upon later to orient itself).

in one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., such as for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and builds a map of an area, and then the robot can upload the data to the cloud 410 to share this knowledge with all other robots. In this example, a transportation of the given robot's "consciousness" can be made through the cloud 410 from one robot to another (e.g., robot "Bob" builds a map, and the knowledge of "Bob" can be downloaded onto another robot to receive knowledge of the map).

Thus, within examples, the robots 402, 404, 406, and 408 may share information through the cloud 410, and may access the database 412.

4. Robot and Cloud Functions Based on Latency of the Cloud

As mentioned, robots (or any client computing device) may interact with the cloud to perform any number of functions. Functions may be delayed or modified based on latency of the cloud. For example, the cloud may comprise a number of networks, and in instances in which the robot is coupled to the cloud or communicates via the cloud, messages to and from the robot may be delayed due to limitations of the networks.

In some examples, a location of a robot may be determined based upon a GPS sensor on the robot. For instance, the robot may provide its location to the cloud using the GPS sensor. The robot may use other location sensors or functions to determine a location, such as cellular tower triangulation methods or WiFi localization techniques. However, in other examples, a robot may not be able to use GPS to determine its location, such as, when network conditions prevent the robot from either determining or transmitting its exact location. In such examples, a location of the robot may be estimated based on a planned or known trajectory or path (e.g., location, speed, direction, etc.).

In some examples, a user may control or operate a robot over the cloud (e.g., send commands to the robot over the cloud), and the cloud may comprise a number of networks. The robot may have a camera, and a user may receive an output of the camera so as to see a view from the robot's point of view to enable control of the robot. In some examples, a robot may be moving forward and collecting image data that is provided to a server. A user may view the image data in real-time, however, the user will receive the image data at a time after the robot has collected the data. A user would like to have a representation of images seen at a current state by the robot (rather than those seen one second ago, for example), see an exact or substantially exact representation of image data as seen by the robot. The server may thus develop a representation of image data representing data expected to be collected by the robot, and provide the representation to the user so that the user has a representation of images seen at a current state by the robot.

Figure 5:
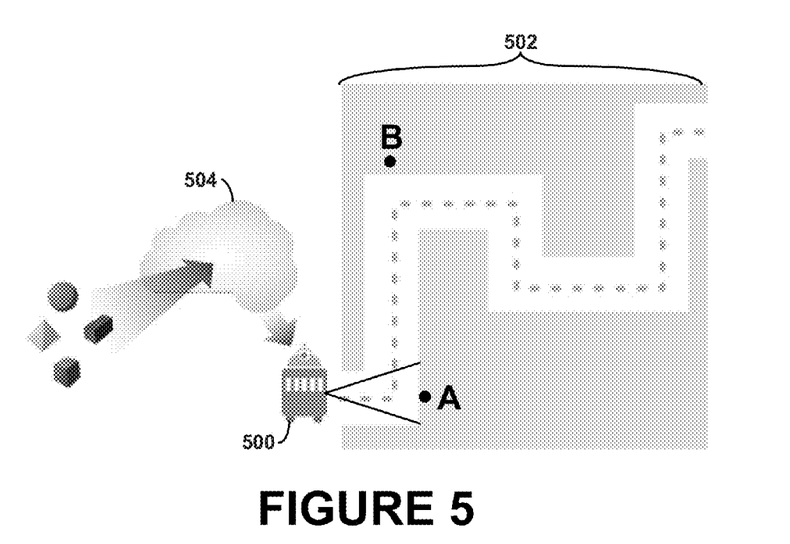
FIG. 5 illustrates an example robot navigating through a pathway.

FIG. 5 illustrates an example robot navigating through a pathway. In FIG. 5, a robot 502 traverses through an area 502 following a pathway. The robot 500 may communicate with a cloud 504 to receive information indicating the pathway, for example. The robot 500 may include a camera and may capture images as the robot 500 traverses through the pathway. As mentioned, the camera data may be provided to a user via the cloud 504 so that the user may see image data from a point of view of the robot.

To overcome any latency issues with the cloud 504 or delivery of the image data, the cloud 504 or components of the cloud may estimate a representation of image data expected to be collected by the robot based on the pathway that the robot 500 is travelling. The cloud 504 may have access to or include a database of maps, navigation pathways, and image data corresponding to points along the navigation pathways or points in the maps. The cloud 504 can determine location data from the robot 500 or estimate a location of the robot 500 based on commands sent to the robot as described above (e.g., known pathway speed, and beginning location). Based on the location information of the robot 500, the cloud 504 can determine a future location of the robot 500 and develop a representation of image data corresponding to the future location. The cloud 504 may then provide the representation of image data corresponding to the future location to the user.

The cloud 504 may develop the representation of image data corresponding to the future location by retrieving such image data from the database that corresponds to the future location. The cloud 504 may retrieve still images, and create a video feed, for example, to be provided to the user. The cloud 504 may provide the estimated representation as well as real-time data received from the robot 500 to the user so that the user may have both data.

Figure 6:
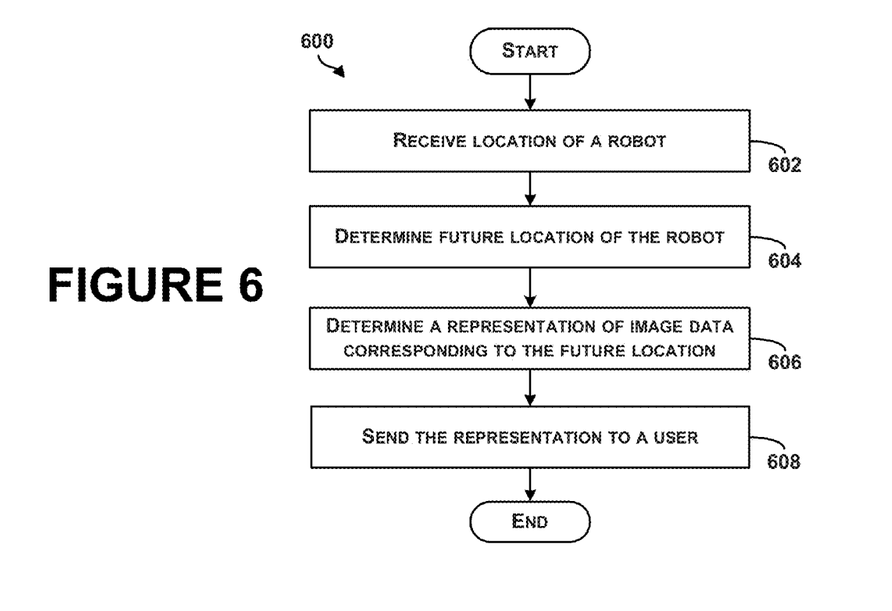
FIG. 6 is a block diagram of an example method of a robot interaction with the cloud to facilitate object recognition.

FIG. 6 is a block diagram of an example method of a robot interaction with the cloud to facilitate object recognition, in accordance with at least some embodiments described herein. Method 600 shown in FIG. 6 presents an embodiment of a method that, for example, could be used with the systems 100 and 400, for example, and may be performed by a device, such as another devices illustrated in FIGS. 1-4, or components of the device. Method 600 may include one or more operations, functions, or actions as illustrated by one or more of blocks 602-608. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

in addition, for the method 600 and other processes and methods disclosed herein, the flowchart shows functionality, and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROW, for example. The computer readable media may also be any other volatile or non-volatile storage systems. The computer readable medium may be considered a computer readable storage medium, for example, or a tangible storage device.

In addition, for the method 600 and other processes and methods disclosed herein, each block in FIG. 6 may represent circuitry that is wired to perform the specific logical functions in the process.

At block 602, the method 600 includes receive location of a robot. For example, as described above, the robot may include a GPS and may provide a location to a server, or the server may estimate the location of the robot based on a known beginning location, a speed of movement of the robot, and a navigation pathway traversed by the robot.

At block 604, the method 600 includes determine future location of the robot. The server may estimate a future location of the robot based on a known beginning location, a speed of movement of the robot, and a navigation pathway traversed by the robot. The future location of the robot may be a location of the robot at a time into the future, e.g., a predetermined amount of time after a current time. The predetermined amount of time may be approximately equivalent to a latency of the cloud. As an example, the server may determine a current location of the robot at time 4:00. In one example embodiment, the latency of the cloud may be determine to be about 1 minute, and thus, the server may determine a future location of the robot, or a location where the robot is expected to be at time 4:01. The predetermined amount of time may be set by a user, the server, or may vary based on latency of the cloud.

At block 606, the method 600 includes determine a representation of image data corresponding to the future location. Continuing with the example above, the server may determine a representation of image data corresponding to the location where the robot is expected to be at time 4:01. The server may determine the representation of image data by accessing a database and retrieving image data corresponding to the future location.

At block 608, the method 600 includes send the representation to a user. For example, the server may forward the representation to the user.

Using the example method 600 in FIG. 6, a user may receive image data corresponding to a view of the robot as approximately currently seen by the robot so as to enable remote control of the robot over weakly connected networks, for example.

5. Robot Vision

In some examples, a robot may be moving forward, and may capture image data of the forward view. The image data may be provided to a user, such as, for example, using the method 600 in FIG. 6. However, a user may desire to move a camera on the robot to view a left/right area of the robot (or any area different from a default forward view of the robot). In instances in which the user does not have the ability to remotely move the camera on the robot to obtain a different view, or should the user also still like to have a view of where the robot is going (e.g., a forward view), the cloud may provide a forward facing view as well as alternate views to the user.

Referring back to FIG. 5, the robot 500 may be moving forward toward point A, and a camera on the robot may capture image data of the forward view toward point A. A user may desire to see a view to the left of the robot toward point B, such as, for example to determine whether to cause the robot to turn left. The user may query the cloud for an alternate view of the robot, and the cloud may provide the alternate view.

In some examples, in response to a query from a user, the cloud may determine a location of the robot and a directional view desired by the user based on the location of the robot, and develop a representation of the desired view. In some examples, the representation of the desired view may be synthesized from data and not an actual representation of a view from an available camera. In other examples, the representation of the desired view may be developed from actual camera views. The server may develop the representation of the desired view using any functions of the method 600 in FIG. 6, such as to access a database to retrieve image data corresponding to the desired view.

In some examples, the cloud may provide image data to the user representing multiple views from a location of the robot. For example, the cloud may provide image data representing a forward, backward, left and right view from a location of the robot.

6. Robot User Interface

Figure 7:
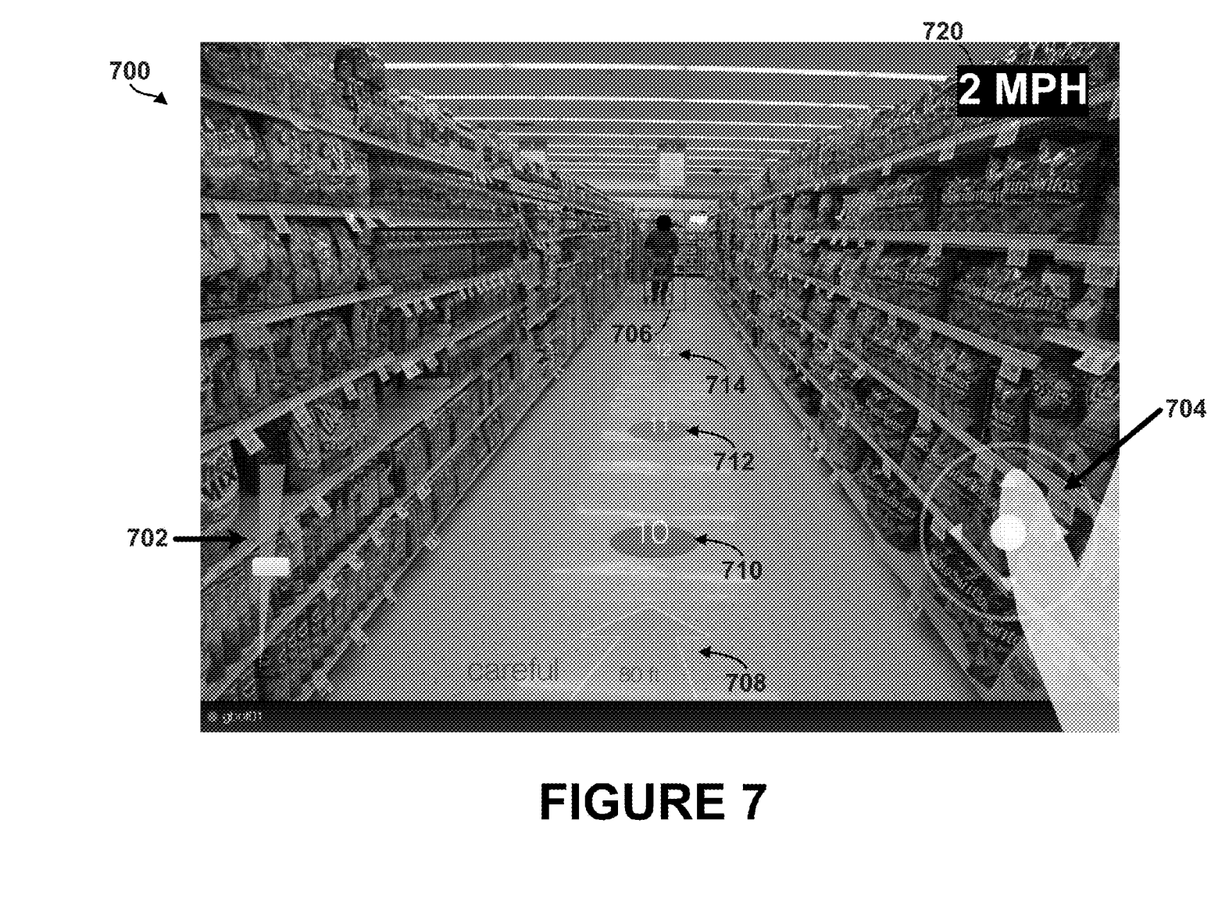
FIG. 7 illustrates an example robot-user interface.

FIG. 7 illustrates an example robot-user interface 700. In FIG. 7, the robot-user interface 700 is displayed on a screen. The robot-user interface 700 functions to provide image data to a user that represents a view of the robot (e.g., a backward, forward, left, right view, etc.).

As shown, the robot-user interface 700 may be overlaid onto the image data, such as overlaying the robot-user interface 700 onto real-video (e.g., a video feed). The robot-user interface 700 enables a user to control actions of the robot. Using the robot-user interface 700, the user sees the video feed from the robot, and the interface overlays onto the view of the robot enabling the user to select items in the view, etc., thereby making the video-feed a part of the interface and allowing the user to manipulate items in the video feed. Similarly, graphics of the user interface can be overlaid onto the video feed.

The robot-user interface 700 may include many user controls, such as a slide bar zoom control 702 in which a user may zoom in or out on an area of the image by sliding the bar up or down. The robot-user interface 700 may also include a navigation control 704 including up/down and left/right arrows in which the user may control movement of the robot by pressing the arrows or sliding a finger around the circle on the navigation control 704 to control a direction of movement.

In some examples, the robot-user interface 700 may be provided or configured for use on a touchscreen display so that a user may provide inputs to the robot-user interface 700 by touching the controls.

The robot may be configured to detect objects in a pathway of the robot. In the image in FIG. 7, the robot has detected object 706. The robot-user interface 700 may identify object 706 by placing a box on the object to indicate to the user that the object 706 is being identified. In addition, in some examples, the robot may estimate a distance to the object 706, such as about 80 ft. in the example in FIG. 7. The robot-user interface 700 may provide a graphic 708 to indicate to the user the distance so that the user may control movement of the robot accordingly.

The robot-user interface 700 may further provide graphics 710, 712, and 714 overlaid onto the image. The user may select any of graphics 710, 712, and 714, which may each be individually programmed to execute a function. For example, a user may select graphic 710 to cause the robot to travel to the location marked by the dot "10". Similar functions may be executed by the robot by user selection of graphics 712 and 714.

The robot-user interface 700 may enable the user to interact with or select items in the image as well. For example, the image in FIG. 7 is an aisle in a grocery store. The robot-user interface 700 may enable a user to select a bag of potato chips to the right to cause the robot to pick up or grab the bag of potato chips. In this manner, the robot-user interface 700 may make each item in the image selectable.

To make items in the image selectable, a server (e.g., the cloud) may receive the image data from the robot and may perform object recognition on the image data so as to provide an estimation of locations of objects in the image. The server may then provide the object recognition outputs to the robot-user interface 700 to enable the robot-user interface 700 to map recognized objects with selectable items in the image.

In another embodiment, the user interface 700 may include a robot speed indicator 720. The speed indicator may take various forms and is not limited to the embodiment shown in FIG. 7. In one embodiment, the speed indicator has text on a colored background. The colored background may indicate an associated confidence level of the speed displayed on the speed indicator. For example, if the background is red, the speed may be low accuracy predicted speed. If the background is yellow, the speed shown may be based on moderately accurate speed estimation, if the background is green, the speed shown may be very accurate speed information provided from the robot. The colors and indication style are simply one example. Many other indication systems may be implemented. In another example embodiment, the text may change color or size depending on the associated confidence level of the displayed information. In still a further embodiment, the indicator may take the form of graphic next to data indictor. The graphic may change color, size, or shape depending on the desired configuration.

Thus, the robot-user interface 700 enables sensor data to be overlaid onto a video feed, and enables a user to interact with a robot in a three-dimensional environment, for example. Robot speed indicator 720 is just one example parameter for which the user in robot-user interface 700 may display a predicted value. A user may interact with the robot and cause a variety of parameters to change (e.g. speed, position, battery life, orientation, operation mode; acceleration, system status, etc.). The methods and systems described herein are not limited to robot speed. Data from other various sensors may be used as well. Due to network latency and processing power, in some examples, it may be advantageous to use processing power associated with the cloud to calculate predictions for all robot parameters when a command is issued to the robot.

In some embodiments, when a user issues a command to the robot, the robot-user interface 700 may update with a predicted image from the new robot location. The prediction may be made by the device on which the robot-user interface is displayed and/or the cloud. The device on which the robot-user interface is displayed may make a first estimate, which the cloud may later reline with a more accurate estimate. In other embodiments, the cloud may stream predicted images as soon as the cloud receives a robot instruction. As the cloud receives new image data from the robot, it may supplement the predicted image data on the user interface with the actual image data from the robot. The user interface may indicate when the displayed information is predicted and when the display is the actual image from the robot.

In further embodiment, the cloud may allow a simulated action to be performed. For example, if a user touches graphic 714, indicating he or she wants the robot to move to this position, the cloud may receive this command and initiate a simulation. The simulation may use map and sensor data to predict whether the robot could actually move to the position indicated by graphic 714. If the prediction says the robot cannot move to the indicated location (e.g. the robot would run into an obstacle, fail off a cliff, etc.) the user interface may be updated to indicate the movement restriction. For example, the user interface may remove graphic 714 from the display. In other embodiments, graphic 714 may turn change color to red to indicate it cannot be performed currently. Additionally, the user interface may be updated to indicate the possible extent of movement available.

In some additionally embodiments, the device on which the robot-user interface is displayed and/or the cloud may be able to predict actions that cannot be performed before a user tries to initiate said action. The user interface may indicate specific actions cannot be performed based on the prediction. The user interface or the cloud may prevent a user from giving an instruction that the robot will not be able to perform.

Figure 8:
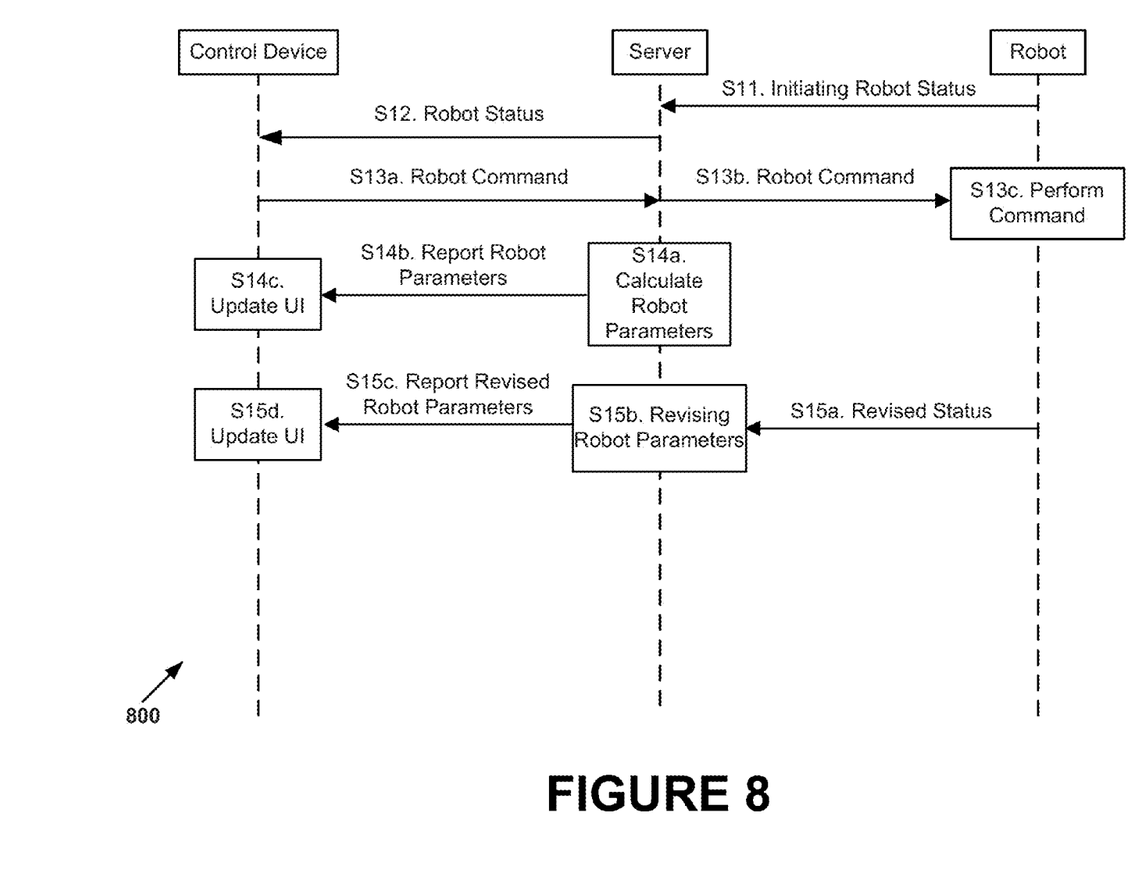
FIG. 8 illustrates a flow diagram of a method of updating a user interface.

FIG. 8 presents a flow diagram of one example embodiment presented herein. Although the blocks are shown in a linear fashion, some may be performed in parallel, while other blocks may be added or removed. At S11, the robot may initiate its status with a server. Initiating robot status may involve sending robot parameters from the robot to the server. In some embodiments, S11 is performed after a robot is turned on, reset, or otherwise beginning functioning in an operation mode. The robot may initiate parameters involving its location, operation mode, orientation and speed. The server may be able to report the robot status and parameters to a control device at S12. The control device may have a user interface for controlling the robot.

Once the control device receives a robot status, the control device may allow a user to send commands to the robot. At S13a, a command is sent from the control device to the server. The command may be an instruction for the robot to move, interact with its environment, or any other function that the robot is capable of performing. The server may responsively send the command to the robot at S13b. The robot may then responsively execute the command at S13c.

While the robot is executing the robot command, the server may calculate robot status parameters at S14a. The calculated status parameters may be based on the initial robot status provided at S11 and the robot command from S13a. For example, if the robot command instructed the robot to move forward, the calculated robot status parameters may predict the robot's parameters such as speed, position, orientation, etc. The calculated status parameters may be reported to the control device at S14b. In some embodiments, the control device may be able to calculate a robot status parameters on its own without the server or without communicating with the server. The control device can update a user interface (UI) with the calculated robot status parameters at S14c. The UI may show the calculated parameters along with a confidence indictor. The confidence indicator may signal the values are predicted.

While the robot is performing the command and/or when the command has been completed, the robot may send revised status parameters to the server at S15a. The server may receive the revised robot status parameters at S15b and update the stored predicted values with the actual values provided by the robot. The server may relay the revised parameters comprising the actual values from the robot to the control device at S15c. The control device can update the UI with the revised parameters at S15d. The UI may indicate the parameters shown in the interface are the actual values reported by the robot.

Figure 9:
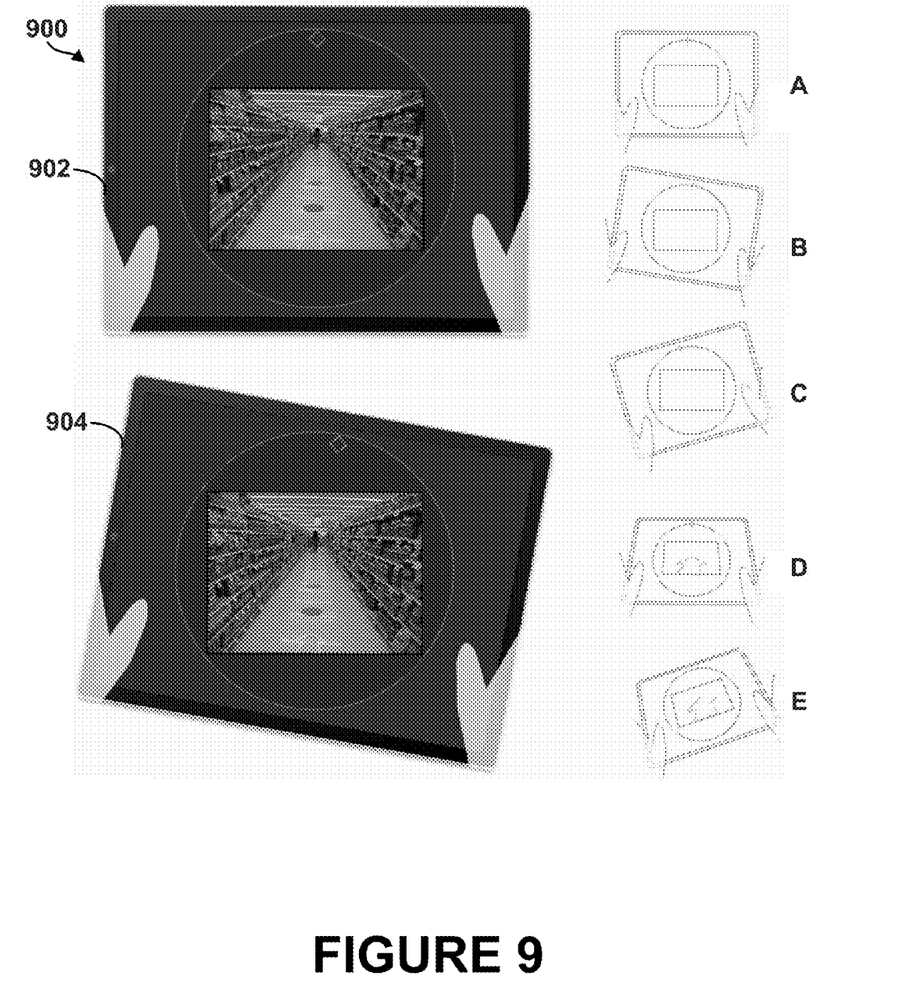
FIG. 9 illustrates example configurations for controlling movement of a robot based on movement of the display device.

In some examples, a robot-user interface may enable control of the robot based on movement of the device on which the robot-user interface is displayed. FIG. 9 illustrates example configurations for controlling movement of a robot based on movement of the display device. As shown, a display device 900 may display a robot-user interface (e.g., the robot-user interface 700 of FIG. 7). In one example, to cause the robot to turn right, a user may rotate the device, such as shown between images 902 and 904, or from images A to B, A user may cause the robot to turn left by rotating the device 900 in an opposite direction, such as shown in image C. In some examples, the user may cause the robot to move forward or backward by tilt the device 900 forward or backward as shown in image D. In still further examples, the user may cause the robot to turn and move at the same time by rotating and tilting the device 900, as shown in image E.

Figure 10:
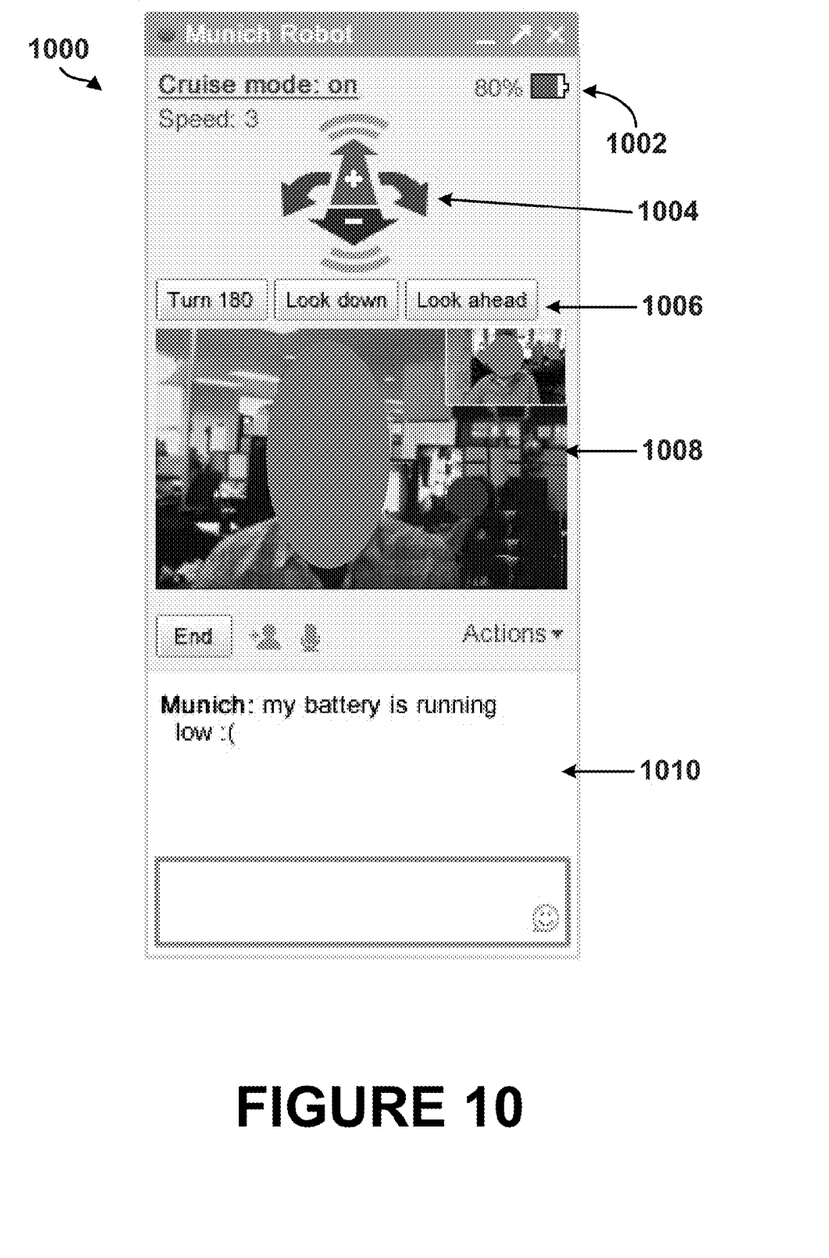
FIG. 10 illustrates another example robot-user interface, all arranged in accordance with at least some embodiments described herein.

FIG. 10 illustrates another example robot-user interface 1000. The robot-user interface 1000 includes a battery meter 1002, such as to indicate a battery life of the robot, a navigation control 1004 to control movement of the robot, and other functional controls 1006 (e.g., turn 180 degrees, look down, or look ahead). The other functional controls 1006 may be preprogrammed control based on user preferences, for example.

The robot-user interface 1000 also includes a video feed 1008 to show the user a point of view of the robot. Further, the robot-user interface 1000 may include a chat box 1010 in which the robot may provide messages to the user,

7. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

White various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses further describe aspects of the present description.

What is claimed is:

1. A method comprising:
   receiving data indicative of a status of a robotic device, wherein the data comprises one or more attributes of the robotic device;
   generating a display of at least a subset of the one or more attributes of the robotic device in a user interface;
   transmitting a robot command for the robotic device;
   receiving data indicative of a revised status of the robotic device, wherein the revised data comprises one or more revised attributes of the robotic device and one or more respective data confidence indicators, wherein the one or more respective data confidence indicators indicate a source of the revised data, wherein the source is the robotic device or a server; and
   generating a display of at least a subset of the data indicative of the revised status of the robotic device in the user interface including, for each of the subset of the data indicative of the revised status of the robotic device, a display associated with the respective data confidence indicator.

2. The method of claim 1, wherein:
   receiving data indicative of a status of a robotic device comprises receiving data from a server with a control device;
   transmitting a robot command comprises transmitting a command from the control device to the server; and
   receiving revised data indicative of the robots status comprises receiving data from the server with the control device.

3. The method of claim 1, wherein the data indicative of a status of a robotic device comprises an image from a camera connected to the robotic device.

4. The method of claim 1, wherein the data indicative of a status of a robotic device comprises a video from a camera connected to the robotic device.

5. The method of claim 1, wherein the data indicative of a status of a robotic device comprises data from sensors associated with a robot.

6. The method of claim 5, wherein the data indicative of a status of a robotic device comprises a robot velocity.

7. The method of claim 5, wherein the data indicative of a status of a robotic device status comprises a robot position.

8. The method of claim 1, wherein the display associated with the associated data confidence indicator includes a color, wherein the color changes based on the confidence indicator.

9. A method comprising:
   receiving data indicative of a status of a robotic device, wherein the data comprises one or more attributes of the robotic device;
   transmitting the data indicative of a status of a robotic device;
   receiving a robot command;
   transmitting the robot command;
   determining revised data indicative of a status of a robotic device, wherein the revised data comprises a calculated prediction of data indicative of the robots status based on the transmitted robot command and wherein the calculating includes an associated data confidence indicator for each calculated prediction, wherein the associated data confidence indicator indicates the data is predicted;
   transmitting the revised data indicative of a status of a robotic device and the associated data confidence indicator for each calculated prediction;
   receiving data indicative of a status of a robotic device, wherein the data comprises received robot attributes;
   determining further revised data indicative of a status of a robotic device, wherein the revised data comprises the received data indicative of a status of a robotic device and wherein the determining includes an associated data confidence indicator for the received data indicative of a status of a robotic device, wherein the associated data confidence indicator indicates the data is received; and
   transmitting the further revised data indicative of a status of a robotic device and the associated data confidence indicator.

10. The method of claim 9, wherein the data indicative of a status of a robotic device comprises an image from a camera connected to the robotic device.

11. The method of claim 9, wherein the data indicative of a status of a robotic device comprises a video from a camera connected to the robotic device.

12. The method of claim 9, wherein data indicative of a status of a robotic device comprises data from sensors associated with a bot.

13. The method of claim herein the data indicative of a status of a robotic device comprises a robot velocity.

14. The method of claim 12, wherein the data indicative of a status of a robotic device comprises a robot position.

15. The method of claim 9, wherein the display associated with the associated data confidence indicator includes a color, wherein the color changes based on the confidence indicator.

16. An article of manufacture including a non-transitory computer-readable medium, having stored thereon program instructions that, if executed by a computing device, cause the computing device to perform operations comprising:
   receiving data indicative of a status of a robotic device, wherein the data comprises one or more attributes of the robotic device;
   generating a display of at least a subset of the one or more attributes of the robotic device in a user interface;
   transmitting a robot command;
   receiving data indicative of a revised status of the robotic device, wherein the revised data comprises one or more revised attributes of the robotic device and one or more respective data confidence indicators, wherein the one or more respective data confidence indicators indicate a source of the revised data, wherein the source is the robotic device or a server; and generating a display of at least a subset of the data indicative of the revised status of the robotic device in the user interface including, for each of the subset of the data indicative of the revised status of the robotic device, a display associated with the respective data confidence indicator.

17. The article of manufacture of claim 16, wherein:

receiving data indicative of a status of a robotic device status comprises receiving data from a server with a control device;

transmitting a robot command comprises transmitting a command from the control device to the server; and receiving revised data indicative of the robots status comprises receiving data from the server with the control device.

18. The article of manufacture of claim 16, wherein the data indicative of a status of a robotic device comprises an image or a video from a camera connected to the robotic device.

19. The article of manufacture of claim 16, wherein the data indicative of a status of a robotic device comprises data from sensors associated with a robot.

20. The article of manufacture of claim 19, wherein the data indicative of a status of a robotic device comprises a robot velocity.

21. The article of manufacture of claim 19, wherein the data indicative of a status of a robotic device comprises a robot position.

22. The article of manufacture of claim 16, wherein the display associated with the associated data confidence indicator includes a color, wherein the color changes based on the confidence indicator.

23. An article of manufacture including a non-transitory computer-readable medium, having stored thereon program instructions that, if executed by a computing device, cause the computing device to perform operations comprising:

receiving data indicative of a status of a robotic device, wherein the data comprises one or more attributes of the robotic device;

transmitting the data indicative of a status of a robotic device;

receiving a robot command;

transmitting the robot command;

determining revised data indicative of a status of a robotic device, wherein the revised data comprises a calculated prediction of data indicative of the robots status based on the transmitted robot command and wherein the calculating includes an associated data confidence indicator for each calculated prediction, wherein the associated data confidence indicator indicates the data is predicted;

transmitting the revised data indicative of a status of a robotic device and the associated data confidence indicator for each calculated prediction;

receiving data indicative of a status of a robotic device, wherein the data comprises received robot attributes;

determining further revised data indicative of a status of a robotic device, wherein the revised data comprises the received data indicative of a status of a robotic device and wherein the determining includes an associated data confidence indicator for the received data indicative of a status of a robotic device, wherein the associated data confidence indicator indicates the data is received; and transmitting the further revised data indicative of a status of a robotic device and the associated data confidence indicator.

24. The article of manufacture of claim 23, wherein the data indicative of a status of a robotic device comprises an image or a video from a camera connected to the robotic device.

25. The article of manufacture of claim 23, wherein the data indicative of a status of a robotic device comprises data from sensors associated with a robot.

26. The article of manufacture of claim 25, wherein the data indicative of a status of a robotic device comprises a robot velocity.

27. The article of manufacture of claim 25, wherein the data indicative of a status of a robotic device comprises a robot position.

28. The article of manufacture of claim 23, wherein the display associated with the associated data confidence indicator includes a color, wherein the color changes based on the confidence indicator.

* * * * *